(12) United States Patent
Chang

(10) Patent No.: US 7,519,284 B2
(45) Date of Patent: Apr. 14, 2009

(54) AUTOMATIC FOCUSING MECHANISM

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 466 days.

(21) Appl. No.: 11/305,385

(22) Filed: Dec. 16, 2005

(65) Prior Publication Data
US 2006/0140610 A1 Jun. 29, 2006

(30) Foreign Application Priority Data
Dec. 24, 2004 (CN) ......................... 2004 1 0091854

(51) Int. Cl.
*G03B 13/36* (2006.01)
*G02B 3/12* (2006.01)
(52) U.S. Cl. ..................... 396/89; 348/345; 359/665
(58) Field of Classification Search .............. 396/89, 396/72, 79, 85, 133; 359/665, 666; 348/335, 348/345
See application file for complete search history.

(56) References Cited
U.S. PATENT DOCUMENTS
4,989,958 A * 2/1991 Hamada et al. ............. 359/666

6,445,509 B1 * 9/2002 Alden ....................... 359/666
2005/0264531 A1 * 12/2005 Tai et al. ..................... 345/163
2006/0050416 A1 * 3/2006 Chung et al. ................ 359/819

FOREIGN PATENT DOCUMENTS
CN 2539201 Y 3/2003
JP 7-151908 6/1995

* cited by examiner

Primary Examiner—William B. Perkey
(74) Attorney, Agent, or Firm—Steven M. Reiss

(57) ABSTRACT

An automatic focusing mechanism (100) is suitable for a digital camera in a portable electronic device. A preferred embodiment of automatic focusing mechanism includes a barrel (1), a holder (2), an optical module (3), and an image sensor structure (4). The barrel receives at least one lens (10) therein. The holder receives the barrel and the image sensor structure therein, and the thickness of the optical module can be changed for focusing. The optical module is located between the barrel and the image sensor structure. As the thickness of the optical module can be changed for achieving the purpose of focusing, the thickness and weight of the digital camera can be decreased.

11 Claims, 3 Drawing Sheets

AUTOMATIC FOCUSING MECHANISM

BACKGROND OF THE INVENTION

1. Field of the Invention

The present invention relates to an automatic focusing camera and, more particularly, to an automatic focusing mechanism therefore.

2. Discussion of the Invention

As is well known, in a conventional automatic focusing camera, a focusing lens is guided in a direction parallel to a lens optical axis by a guide groove or a guide rod. Further, such a focusing lens is typically moved along the lens optical axis by a moving member driven by a focus control motor, through a multi-stage reduction gear train.

Therefore, in the structure of the automatic focusing camera, a reduction gear ratio of the linear movement of the moving member to the rotation of the focus control motor becomes very high. As such, a large number of reduction gears must be used in order to obtain such a reduction gear ratio. In this structure, since the guide member and the moving member of the focusing lens are separated by a given distance, a mechanical play or deformation between such parts can cause an extension error along the lens optical axis of the focusing lens. Since the moving direction of the moving member is not further error-adjusted with respect to the lens optical axis, an error in the moving direction of the moving member is directly reflected in the extension error of the focusing lens. In this structure, during adjustment after camera assembly, focusing must be performed so that the position of the focusing lens is adjusted to an infinite focal point. For the purpose of focusing, a plurality of adjusting screws is arranged between the focusing lens and a lens holding frame. Since these adjusting screws are have to be provided, an assembly of the focusing lens is complicated, and a lubricant may need to be attached to the surface of the focusing lens, thus potentially contaminating the focusing lens.

In the automatic focusing camera of this type, in order to cause the optical axis of the focusing lens to coincide with the lens optical axis, a fine-adjustment means for the guide member must be arranged.

In other words, in an automatic focusing mechanism of the conventional automatic focusing camera, a large number of components are required in order to obtain a high reduction gear ratio and to adjust the optical axis of the focusing lens. A space for assembling these components is required, resulting in high manufacturing cost and an increase in mechanism size and weight.

Therefore, what is needed is an automatic focusing mechanism that overcomes the above-described problems.

SUMMARY OF THE INVENTION

An automatic focusing mechanism is suitable for a digital camera in a portable electronic device. A preferred embodiment of automatic focusing mechanism includes a barrel, a holder, an optical module, and an image sensor structure. The barrel receives at least one lens therein. The holder receives the barrel and the image sensor structure therein, and the thickness of the optical module can be changed to initiate focusing. The optical module is located between the barrel and the image sensor structure.

The automatic focusing mechanism includes an optical module, which has an adjustable thickness for achieving the purpose of focusing. Thus, the thickness and weight of the digital camera can be decreased. During the focusing process, none of the barrel, the holder, the image sensor structure, and the optical module are moved along the lens optical axis. Automatic focusing is easily achieved by changing the thickness of the optical module instead of relying on conventional mechanical movement.

Other advantages and novel features will become more apparent from the following detailed description when taken in conjunction with the accompanying drawings.

BRIEF DESCRIPTION OF THE DRAWINGS

Many aspects of the automatic focusing mechanism can be better understood with reference to the following drawings. The components in the drawings are not necessarily to scale, the emphasis instead being placed upon clearly illustrating the principles of the present automatic focusing mechanism. Moreover, in the drawings, like reference numerals designate corresponding parts throughout the several views.

DETAILED DESCRIPTION OF THE EMBODIMENTS

Figure 1:
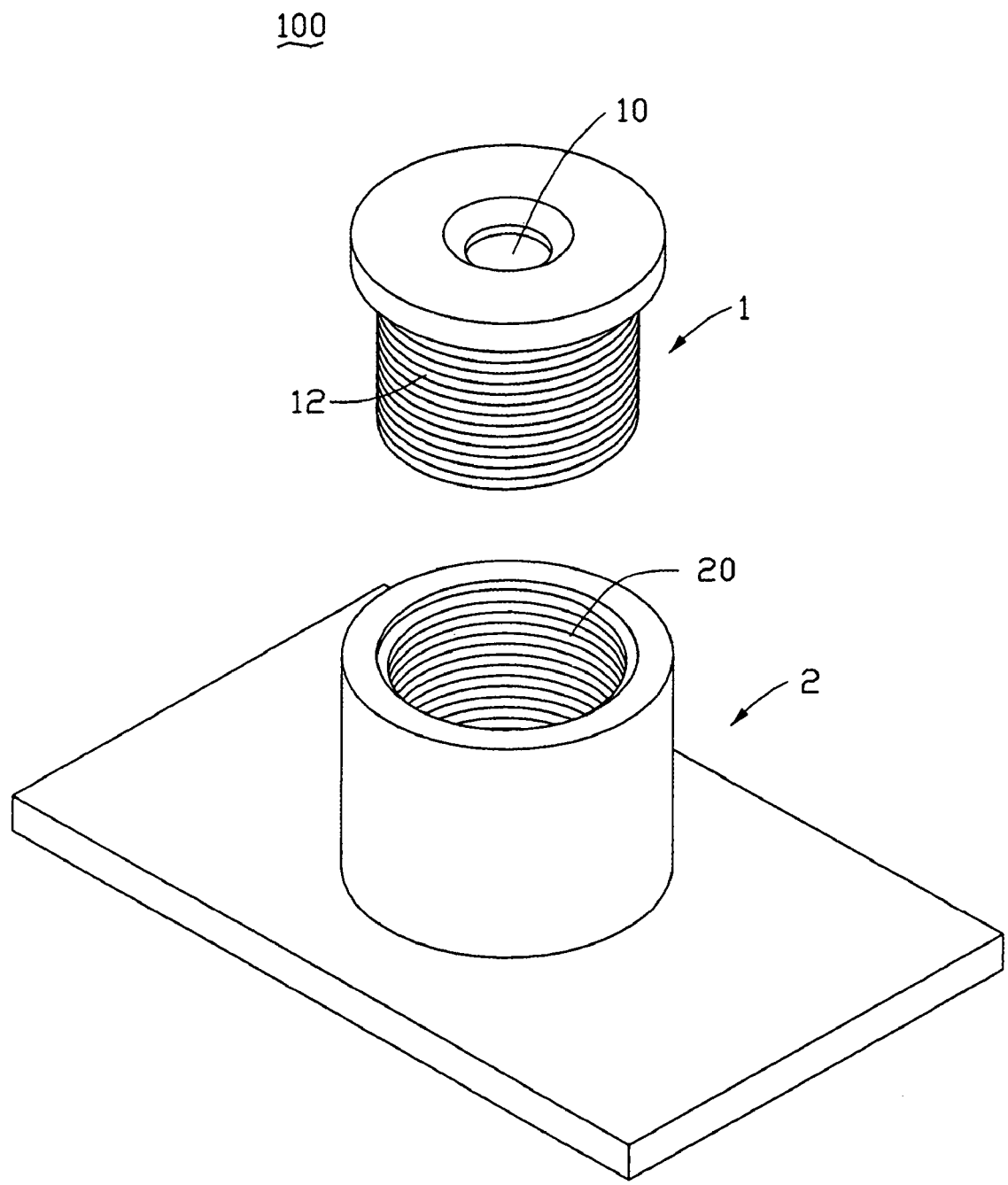
FIG. 1 is an exploded, isometric view of the automatic focusing mechanism, in accordance with a preferred embodiment of the present automatic focusing mechanism.
Figure 2:
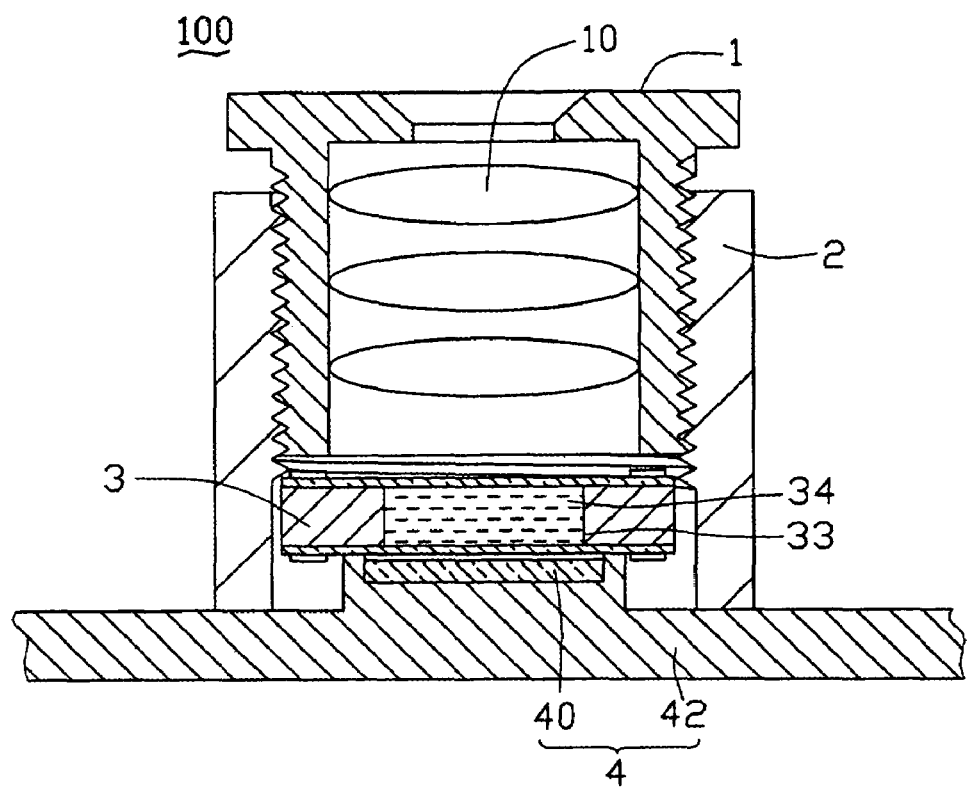
FIG. 2 is a cross-sectional, assembled view of the automatic focusing mechanism shown in FIG. 1.

Referring now to FIG. 1 and FIG. 2, in a preferred embodiment, an automatic focusing mechanism 100 includes a barrel 1, a holder 2, an optical module 3, and an image sensor structure 4. The barrel 1, the optical module 3, and the image sensor structure 4 are all assembled within the holder 2. The barrel 1 is fixed in one end of the holder 2, and the image sensor structure 4 is positioned proximate the opposite end of the holder 2. The optical module 3 is located between the barrel 1 and the image sensor structure 4.

The barrel 1 is substantially a hollow cylinder and receives at least one lens 10 therein. The barrel 1 also has a plurality of outside screw threads 12 defined thereon near one end thereof.

The holder 2 is also substantially a hollow cylinder and has an inner diameter larger than that of the barrel 1. The barrel 1 has a plurality of inside screw threads 20 therein proximate one end thereof, and the inside screw threads 20 can engage with the outside screw threads 12 of the barrel 1 for connecting the barrel 1 and the holder 20 together. It is to be understood that the barrel 1 and the holder 20 could, alternatively or additionally, be held/joined together, e.g., by some other mechanical means other than screw threading and/or by an adhesive or metallurgical bonding procedure. The screw threading arrangement does offer the benefits of easy and low-cost assembly.

Figure 3:
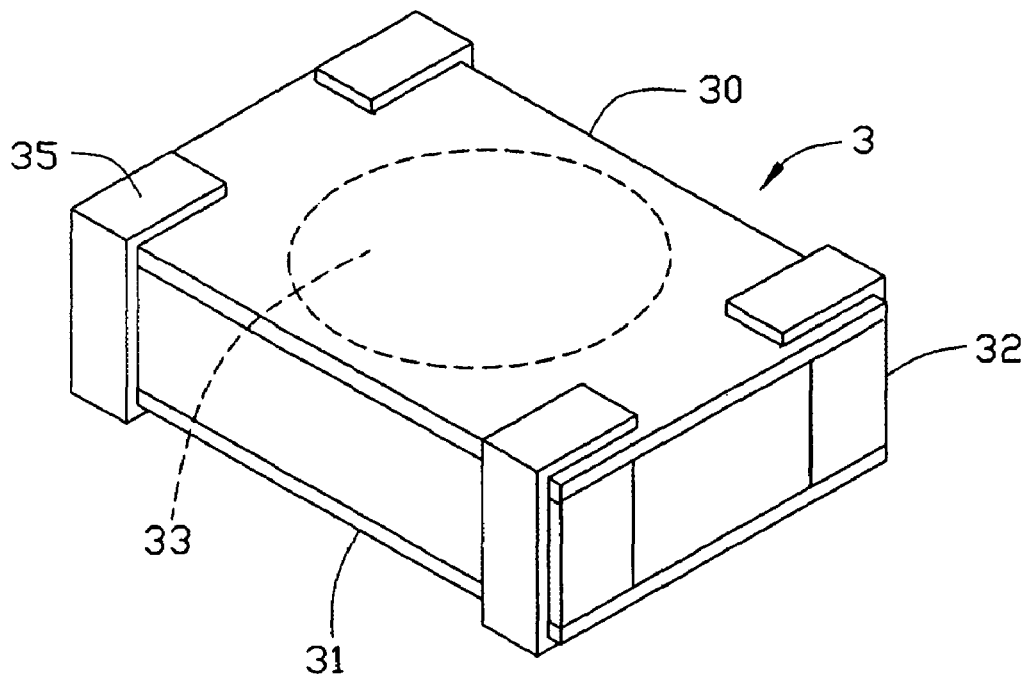
FIG. 3 is an isometric view of the optical module of the automatic focusing mechanism of the preferred embodiment.

Referring now to FIG. 3, the optical module 3 is substantially a cuboid or rectangular parallelepiped which light rays can pass through. The optical module 3 includes a first plate 30, a second plate 31, and four piezoelectric poles 32 configured for supporting the first plate 30 and the second plate 31 and controlling the spacing therebetween. The central area of the optical module 3 is adapted to permit light to pass therethrough and is coaxial (or at least substantially so) with the lens 10 in the barrel 1. The first plate 30 and the second 31 are both made of a transparent material, such as an optical glass or plastic material. The first plate 30 is coated with IR-cut (Infra-cut) coating (not shown) for filtrating infrared rays front the air so as to improve the image quality, and the second plate 31 is coated with an AR (anti-reflection) coating (not shown). The piezoelectric poles 32 are made of a piezoelectric material, such as PZT (lead zirconate titanate) or another ceramic piezoelectric material (e.g., barium titanate, lead zirconate, and lead titanate). The piezoelectric material can produce a mechanical deformation under an electric field. Each of the piezoelectric poles 32 is connected-with a power supply (not shown), and the power supply can produce an electric field which can make the piezoelectric pole 32 produce a deformation so as to move the first plate 30 and the second plate 31 toward or away from one another. Thus, the thickness of the optical module 3 can be changed (i.e., increased or decreased). While four such poles 32 are beneficially employed to help provide stable and even movement of the first plate 30 relative to the second plate 31, it is to be understood, within the scope of the present device, that a relative movement between the plates 30, 31 could potentially be achieved using at least one such pole 32.

Figure 4:
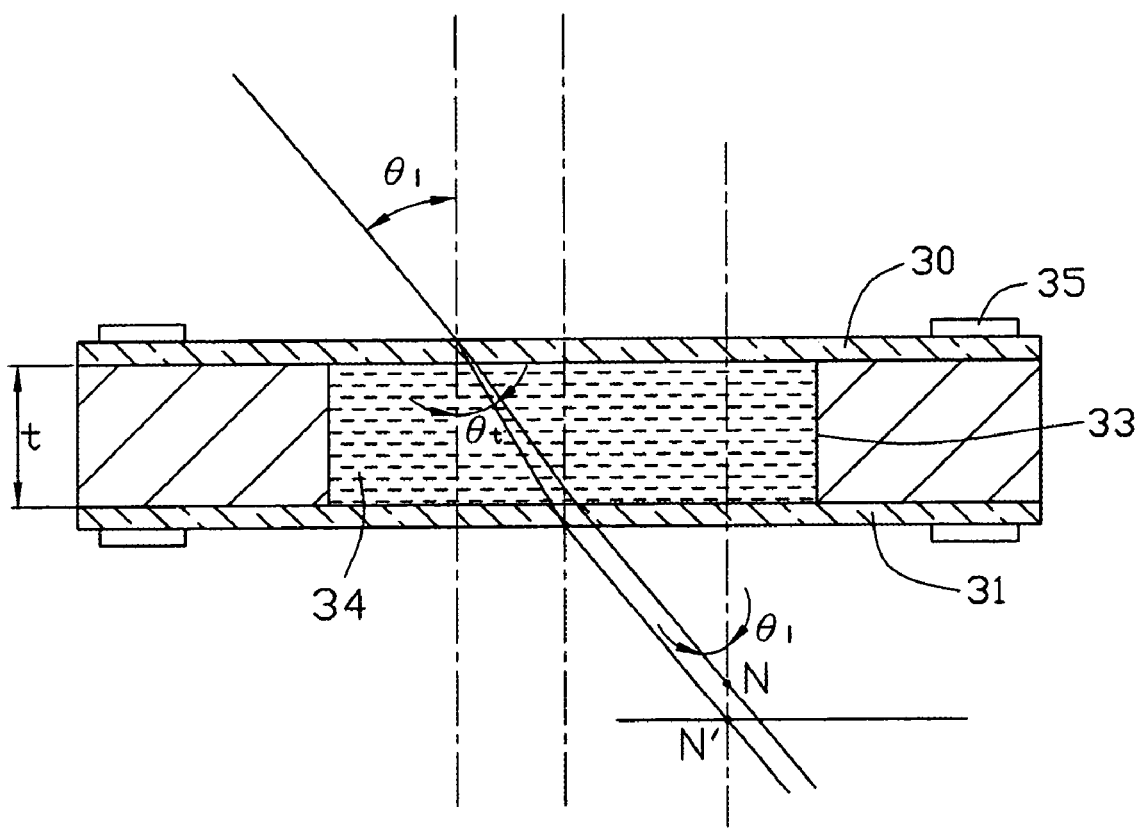
FIG. 4 is a schematic view of the light path when light rays pass through the optical module of the automatic focusing mechanism of the preferred embodiment.

Referring now to FIG 4, the first plate 30, the second plate 31, and the four piezoelectric poles 32 together define a middle space which receives a transparent cylindrical elastic member 33 therein. The transparent cylindrical elastic member 33 is a hollow cylinder and is at least substantially coaxial with the central area of the optical module 3. The transparent elastic member 33 receives a transparent liquid 34 therein, the transparent liquid 34 being chosen to allow light rays to pass therethrough. Further, the transparent liquid 34 beneficially has a refractive index of more than 1.2 (i.e., advantageously in excess of the refractive index of the first plate 30 and/or the second plate 31 to promote light refraction at the interfaces with one or both such plate 30, 31). In alternative embodiments, the transparent liquid 34 can also be replaced by a sufficiently elastic and refractive solid material.

The optical module 3 also includes four elastic metal pieces 35 which are essentially [-shaped. The four elastic metal pieces 35 can be used for clamping the transparent elastic member 33 between the first plate 30 and the second plate 31, and also can keep the first plate 30 and the second plate 31 in a parallel state connecting with the piezoelectric poles 32. It is to be understood that a number other than four such metal pieces 35 could be employed and be within the scope of the present embodiment.

Referring again to FIG. 2, the image sensor structure 4 is connected in the holder 2 at an end opposite to the one in which the barrel 1 is received. The image sensor structure 4 includes an image sensor 40 and a mounting package 42. The image sensor 40 is usually a charge-coupled device (CCD) or a complementary metal-oxide semiconductor (CMOS). The image sensor 40 is configured for transferring light signals, received through the optical module 3, into electronic signals. The mounting package 42 is configured for receiving the sensor 40 and for facilitating mounting thereof relative to the holder 2 (e.g., mechanically, adhesively, and/or metallurgically).

Firstly, in assembling the optical module 3, the transparent elastic member 33 is mounted on the second plate 31 and is then filled with the transparent refractive liquid 34 or another chosen refractive material. The transparent elastic member 33 is positioned so as to ultimately be received in the middle space, which is formed by the first plate 30, the second plate 31, and the four piezoelectric poles 32. The transparent elastic member 33 should be axial (or substantially so) with the central area of the optical module 3. Then, the four elastic metal pieces 35 are used for clamping the transparent elastic member 33 between the first plate 30 and the second plate 31 and to keep the first plate 30 and the second plate 31 in a parallel state, connecting with the piezoelectric poles 32. Secondly, the image sensor structure 4 is connected to one end of the holder 2 and made to axially align with the holder 2. Then, the optical module 3 is fixed on the image sensor structure 4. The barrel 1 is then threadedly connected in one end of the holder 2, with the inside screw threads 20 engaging with the outside screw threads 12. Thereby, the automatic focusing mechanism 100 is assembled to a whole.

In operation, light rays pass through the at least one lens 10, the first board 30, the transparent elastic member 33, the refractive liquid 34, and the second board 31 of the optical module 3, in turn, and then received by the image sensor 40 of the image sensor structure 4.

Referring again to FIG. 4, in focusing operation, each of the piezoelectric poles 32 is connected with a power supply (not shown), and the power supply can produce an electric field which can make each respective piezoelectric pole 32 produce a deformation so as to move the first board 30 relative to the second board 31, and thus, the transparent elastic member 33 between the first board 30 and the second board 31 can be distorted. Accordingly, the thickness of the optical module 3 can be changed. When, the focusing operation is not powered, the piezoelectric poles do not connect with a power supply, and the optical module 3 can return the original thickness and the distortion of the transparent elastic member 33 can be eliminated.

Because the transparent elastic member 33 is filled with the refractive transparent liquid 34, light rays can produce refraction when passing through the transparent elastic member 33, and thus, the path of the light rays can be changed. Suppose that, the transparent elastic member 33 is not filled with such transparent liquid 34 but instead with air, so when light rays pass through the first board 30 and the second board 31, the imaging point is at point N. If, however, the light rays pass through the transparent liquid 34 filled in the transparent elastic member 33, and suppose the refractive index of the transparent liquid 34 is n and the refractive index of the air is $n_0$, thus we can get a formula (1):

$$n_0 \sin \theta_i = n \sin \theta_t \quad (1)$$

wherein, $\theta_i$ is an angle of incidence and $\theta_t$ an angle of refraction. In the preferred embodiment, the refractive index of the transparent liquid 34 is more than about 1.2 and refractive index of the air is 1.0, so the $\theta_t$ is less than the $\theta_i$. Therefore, when light rays pass through the transparent liquid 34 filled in the transparent elastic member 33, the imaging point is at point N,' which is different from the point N.

Regarding to the formula (1) and the relation of sin θ and legs in right-angled triangle, when the $\theta_i$ is small, thus we can get a formula (2):

$$NN' = t(1 - 1/n)/\theta_t \quad (2)$$

wherein, t is the thickness of the optical module 3 and n is the refractive index of the transparent liquid 34. NN' is the distance between the point N' and the point N. Regarding formula (2), the length of NN' is in a direct ratio with the thickness t. Therefore, the length of the four piezoelectric poles 32 can change under an electric field, resulting in a change of the thickness of the optical module 3. As a result, the length of NN' is changed, this change being equal to the change in the distance between the lens 10 and the image sensor 40. In addition, the change of the thickness of the optical module 3 is also in a direct ratio with the change of an electric field, so the change of the length of NN' is continuous to achieve continuous focusing.

The automatic focusing mechanism 100 includes an optical module 3, which has a thickness changed for achieving the purpose of focusing, thus, the thickness and weight of the digital camera can be decreased. In the focusing process, the barrel 1, the holder 2, the optical module 3 and the image sensor structure 4 are all not moved along the lens optical axis, therefore, it is easy for automatic focusing by changing the thickness of the optical module instead of conventional mechanical movement.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. An automatic focusing mechanism suitable for a digital camera, the automatic focusing mechanism comprising:
    a barrel having at least one lens therein;
    a holder including a first end and a second end, the barrel being received in the first end of the holder;
    an image sensor structure connected to the second end of the holder; and
    an optical module located between the barrel and the image sensor structure, the optical module including a first transparent plate, a second transparent plate, four piezoelectric poles and a transparent elastic member, the piezoelectric poles and the transparent elastic member being positioned between the first transparent plate and the second transparent plate, the transparent elastic member configured for changing a path of light rays.

2. The automatic focusing mechanism as claimed in claim 1, wherein each piezoelectric pole is configured for receiving an adjustable electric field from a power supply, each piezoelectric pole being further configured for deformation in reaction to a change in the electric field, such deformation causing the first plate to move relative to the second plate.

3. The automatic focusing mechanism as claimed in claim 2, wherein the first plate the second plate and the four piezoelectric poles together define a middle space, the transparent elastic member is cylindrical, and the middle space receiving the cylindrical transparent elastic member therein.

4. The automatic focusing mechanism as claimed in claim 3, wherein the transparent, elastic member receives a transparent liquid adapted for refracting light rays passing therethrough, the refractive index of the transparent liquid being more than about 1.2.

5. The automatic focusing mechanism as claimed in claim 1, wherein the optical module further comprises a plurality of elastic metal pieces, each elastic metal piece being approximately [-shaped.

6. The automatic focusing mechanism as claimed in claim 5, wherein the elastic metal pieces are configured for clamping the transparent elastic member between the first plate and the second plate and for keeping the first plate and the second plate in a parallel state while in connection with the piezoelectric poles.

7. An automatic focusing mechanism suitable for a digital camera, the automatic focusing mechanism comprising:
    a barrel having at least one lens therein;
    a holder, the barrel being received in the holder; and
    an optical module located in the holder, and aligned with the at least one lens in the barrel, the optical module including:
    a first transparent plate;
    a second transparent plate, the first transparent plate positioned opposite to the first transparent plate;
    at least one piezoelectric pole positioned between the first transparent plate and the second transparent plate, the at least one piezoelectric pole producing a deformation for moving the first plate relate to the second plate; and
    four elastic metal pieces respectively clamping two sides of the first transparent plate and the second transparent plate.

8. The automatic focusing mechanism as claimed in claim 7, wherein each elastic metal piece is [-shaped.

9. The automatic focusing mechanism as claimed in claim 7, further comprising a transparent cylindrical elastic member, the transparent cylindrical elastic member is positioned between the first transparent plate and the second transparent plate, the elastic member is coaxial with the at least one lens, and receives a transparent liquid.

10. The automatic focusing mechanism as claimed in claim 9, wherein a refractive index of the transparent liquid is in excess of a refractive index of the first plate and the second plate.

11. The automatic focusing mechanism as claimed in claim 7, further comprising a transparent cylindrical elastic member, the transparent cylindrical elastic member is positioned between the first transparent plate and the second transparent plate, the elastic member is coaxial with the at least one lens, and receives a sufficiently elastic and solid material.

* * * * *